Aug. 26, 1969     J. A. VAN INGEN     3,463,321
ULTRASONIC IN-LINE FILTER SYSTEM
Filed Feb. 28, 1968
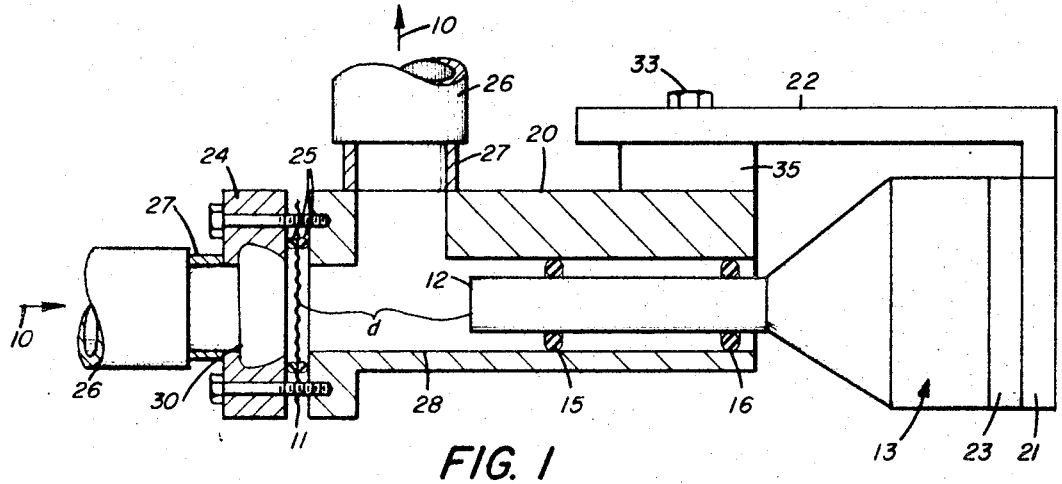
FIG. 1
FIG. 3
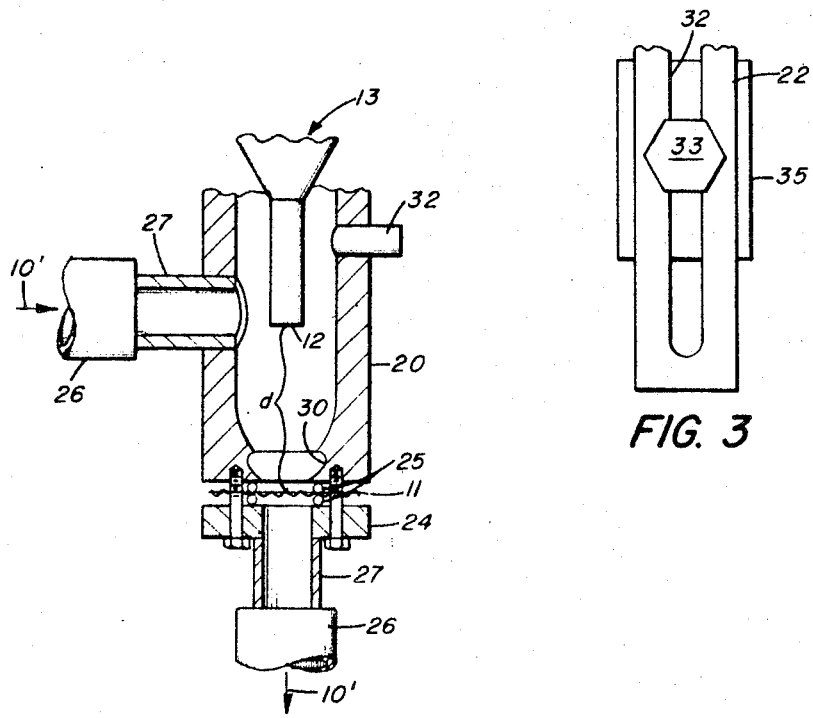
FIG. 2
JACK A. VAN INGEN
INVENTOR.
BY
ATTORNEYS United States Patent Office 3,463,321
Patented Aug. 26, 1969

3,463,321
ULTRASONIC IN-LINE FILTER SYSTEM
Jack A. VanIngen, Webster, N.Y., assignor to Eastman Kodak Company, Rochester, N.Y., a corporation of New Jersey
Continuation-in-part of application Ser. No. 618,471, Feb. 24, 1967. This application Feb. 28, 1968, Ser. No. 708,822
Int. Cl. B01d 35/06
U.S. Cl. 210—388                                    3 Claims

ABSTRACT OF THE DISCLOSURE

A small planar surface fine mesh screen filter has its useful life extended by focusing thereon a beam of ultrasonic energy. The beam is from an ultrasonic transducer surface placed parallel to and spaced an antinodal distance from the small filter. On the upstream side of the filter and adjacent thereto is located an annular recess to collect filtered particles.

Cross-reference to related applications

This appliation is a continuation-in-part of Ser. No. 618,471, filed Feb. 24, 1967, now abandoned.

Background of the invention

The present invention relates to an in-line ultrasonic filter system and more particularly to ultrasonic energization of a filter having very fine apertures.

In the art of filters, it has long been recognized that the over-all filter area tends to determine its total throughput capacity in terms of how much material can flow therethrough before the filter is clogged by filtered particles and lumps. Because fine mesh filters are very expensive, minimum filter area of a workable filter results in economic savings. It is also recognized that mechanical shaking or blade wiping of such a filter tends to remove the various clogging materials and thus to extend the filter's useful life. However, many filters, particularly the ones with very fine apertures, are so fragile that mechanical shaking (as distinguished from fluid transmitted shaking energy) or wiping is detrimental to the structure and may break up the filter or rupture it to destroy its filtering function. Fluid transmitted energy waves are soft compared to erratic mechanical banging and may be efficiently applied. Moreover, it will become apparent from the following disclosure that the use of several ultrasonic vibrators as shown in my copending application Ser. No. 652,649, filed June 28, 1967, is more elaborate and expensive than is required by certain processes.

Therefore, an object of the invention is to provide an improved, efficient and simple ultrasonic in-line filter system.

Summary of the invention

According to one embodiment of my invention an ultrasonic transducer is positioned parallelly aligned with, and at an antinodal distance from, a small fragile flat in-line screen filter finer than 100 microns mesh size. Since energy of the transducer is "in focus" at antinodal ponts, vibrations of the transducer are most effective to vibrate the flat filter and clear it of any clogging material as well as to assist the filtered liquid to pass rapidly therethrough and to dissolve any gas bubbles that might otherwise tend to collect on the filter surface. Moreover, ultrasonics have certain transmission properties commonly identified with high frequency magnetic energy (e.g., radar) transmission. By way of example, sonic energy may be made to travel in a straight line much like a focused beam of energy. The particular transducer used is selected to provide a concentrated energy beam which may be focused on the plane of the filter. Thus, a great deal of sonic energy is efficiently imparted to the small filter screen directly in front of the transducer to greatly increase its total filtering capacity. Yet this sinusoidal sonic energy is not of a harsh type likely to damage the small fragile filter as would externally applied mechanical shaking. It seems to have certain properties similar to heat, e.g., the liquid molecules are agitated at the filter surfaces in a manner somewhat similar to an increase in temperature of the liquid.

The subject matter which is regarded as my invention is particularly pointed out and distinctly claimed in the concluding portion of this specification. The invention, however, as to its organization and operation, together with further objects and advantages, will best be understood by reference to the following description taken in connection with the accompanying drawing, in which:

FIG. 1 is an elevation sectional view of one embodiment of my invention;

FIG. 2 is an elevation sectional view of another embodiment of my invention; and FIG. 3 is a detail plan view of the ultrasonic transducer support means of FIG. 1.

Referring now to the drawing wherein like numbers indicate similar parts, I have shown in FIG. 1 a liquid flow path indicated by arrows 10. The liquid flowing through the path 10 is one of the many liquids that are filtered during various commercial processing. By way of example, liquids that are improved by filtering and tend to clog a fine mesh filter are certain photographic film emulsion gelatines. As indicated in the drawing, the liquid being filtered flows through a small circular filter 11 which is parallel to, aligned with, and spaced an antinodal distance "d" from a vibrating tip 12 of an ultrasonic transducer 13. The surface of the tip 12 and the filter 11 are planar and parallel whereby ultrasonic energy is transferred therebetween in a beam of maximum efficiency. I prefer to have the area of the tip 12 similar to that of the filter 11 so that when the energy beam is properly focused it engages a major portion of the filter 11. The filters most benefited by this ultrasonic agitation are usually of a mesh size smaller than 100 microns. Such screens are fragile, expensive, and easily clogged. In fact, they are so easily clogged that some process operators use them only as a last resort even though they improve the quality of the finished product.

By way of example, one fine mesh in-line screen was used to filter a 40 centipoise gelatinous solution flowing at 2 pounds per minute. With no ultrasonic energy the screen plugged in 62 minutes, after passing about 124 pounds of solution. This is particularly troublesome as about 300 pounds of such a solution are required to complete a batch process. When a batch is used to apply a thin coat to a long web, shut down of such a process in the middle of a run will ruin many square feet of expensive product. In a comparison trial the screen filter did not plug during flow of an entire charge of 300 pounds from the same batch of gelatinous solution, when the ultrasonic energy field was activated. Thus, the beamed ultrasonic energy more than tripled the capacity of the filter. Moreover, the filter itself was in no way damaged and was still in a usable condition after the complete batch was filtered. Thus, it would seem that lumps were both broken up and partially melted by the ultrasonic energy to attain such a radical filter life improvement.

One transducer that works well in this system is a 40 kilocycle lead zirconate device of the type manufactured by the Branson Company. Also, higher frequency transducers will work well with my invention. The illustrated ultrasonic transducer is shaped to concentrate the energy at its tip 12 and is supported by non-energy absorbing means such as resilient fluid sealing O-rings 15 and 16. The O-rings 15 and 16 are supported in a main housing 20 to which the base 21 of the transducer is secured by support means 22. The transducer 13 also contains piezoelectric or equivalent agitation means 23 for energizing it and, more particularly, the tip 12. The agitation means 23 is positioned between the base 21 and the tip 12.

The main housing 20 supports a cap 24 by means such as bolts. The filter 11 is resiliently clamped between a pair of fluid sealing O-rings 25 compressed between the cap 24 and the housing 20. Pipes 26 of the liquid path 10 are secured to the cap 24 and to the main support housing 20 by conventional couplings 27 so that the liquid flows through apertures thereof and through a chamber 28 forming a conduit between the filter 11 at one end and the vibrating tip 12 at the other. The chamber 28 is one antinodal distance in length to attain most efficient ultrasonic energy transfer. The cap 24 forms a liquid conduit means and has an internal annular groove 30 which serves to collect various contamination particles at a point remote from the input surface of the filter 11 itself. The contaminants tend to float to the edge of the vibrating screen and collect in the cavity of the groove 30. This is partially because of the rim support of the filter 11, which causes its center to be more agitated than the edges and partially because of the tendency of a conduit flow to be greater at the center than at the conduit surface. In any event the particles move toward and into the groove 30 when the ultrasonic transducer is energized. If these contaminants are allowed to remain adjacent to the filter they clog it. Thus the filter remains free of clogging particles for a maximum period and the energy of the transducer 13 is beamed at the filter 11 to be most effective in forcing the process liquid therethrough.

Referring now to FIG. 2 a filter system is shown with the liquid flow path 10' being first past the transducer 13 and then through the filter 11 instead of through the filter to the transducer as in FIG. 1. However, in both filter-transducer relationships the spacing between the tip 12 and the filter 11 is one antinodal distance and the chamber 28 is completely filled with the liquid of the system. Also in each case the filter 11 is small and parallelly aligned with the surface of the ultrasonic beam projecting tip 12. In FIG. 2 the annular groove 30 is within the chamber 28. The liquid level and average pressure of the FIG. 2 device is maintained at a fixed magnitude by a simple device in the form of an open overflow drain 32.

The present invention is also quite efficient in disposing of gas in the liquid stream. During a test of the present invention, 0.15% by volume of air was metered into a 40 centipoise gelatinous solution flowing at 2 pounds per minute at 10 p.s.i. After passing through the ultrasonically activated screen filter 11 no gas was detectable in the solution. Moreover, the gas did not collect at the filter surface to clog it.

FIG. 3 shows one satisfactory method for positioning the transducer 13 so that the antinodal distance $d$ results in maximum ultrasonic agitation of the filter 11. The shaft support means 22 is provided with a central slot 32 to accommodate a bolt 33. The bolt 33 is threaded into a stanchion 35 to clamp the vibrating tip 12 at the most effective location. If the filter system is to be used for a single type of liquid, the support 22 may be tack welded to the stanchion 35 once its antinodal distance is established. A single type of liquid would be one in which the speed of sound was known and constant so that the antinodal distance of the transducer remains constant. However, if different types of liquid are to be filtered from time to time, some positional adjustment will increase the efficiency of the energy transducer.

In carrying out the present invention, it is desirable that the vibrating tip 12 of the transducer and the screen filter 11 be spaced a distance $d$ which is an antinode of the transducer frequency thereby obtaining optimum efficiency. This distance can be calculated by the velocity of sound in the particular fluid and the vibration frequency. For example, with the velocity of sound through air-free water being 5000 feet per second at 35° C., and using a transducer frequency of 40 kc./second:

$$\text{wave length} = \frac{5000 \text{ ft./sec.} \times 12 \text{ in./ft.}}{40,000 \text{ cy./sec.}} = 1.5 \text{ in./cy.}$$

As an antinode exists at the point of propagation of sound, i.e., the face of tip 12 of the transducer, other antinodes exist at every half wavelength of the sound path perpendicular to the face. In accordance with this example, antinodes exist at the following distances $d$: ¾ in., 1½ in., 2¼ in., 3 in., etc.

The invention has been described in considerable detail with particular reference to certain preferred embodiments thereof, but it will be understood that variations and modifications can be effected within the spirit and scope of the invention as described hereinabove.

I claim:

1. A liquid filter comprising a housing having a liquid inlet aperture and a liquid outlet aperture, a substantially planar filter member disposed across at least one of said apertures to filter all flow therethrough, an ultrasonic transducer extending into said housing and having an energy transmitting surface disposed in alignment with and substantially parallel to the plane of the filter member, said energy transmitting surface being spaced from said filter member a distance substantially equal to the antinodal distance of the energy transmitted by said transducer, conduit means disposed upstream of said filter member, and an annular recess formed in the inner surface of said conduit means adjacent said filter member wherein particles removed from the liquid by said filter member are collected.

2. The invention according to claim 1 wherein said housing has a generally T-shaped chamber therein, said filter member and said transducer being disposed at opposite ends of the cross portion of the T-shaped chamber.

3. A liquid filter comprising a housing having a liquid inlet aperture and a liquid outlet aperture, a substantially planar filter member disposed across at least one of said apertures to filter all flow therethrough, an ultrasonic transducer extending into said housing and having an energy transmitting surface disposed in alignment with and substantially parallel to the plane of the filter member, said energy transmitting surface being spaced from said filter member a distance substantially equal to the antinodal distance of the energy transmitted by said transducer, and an annular recess formed in the inner surface of said housing adjacent the upstream side of said filter member wherein particles removed from the liquid by said filter member are collected.

References Cited

UNITED STATES PATENTS

| | | | |
|---|---|---|---|
| 1,662,180 | 3/1928 | Ball | 210—388 X |
| 2,769,506 | 11/1956 | Abboud | 55—292 |
| 2,799,398 | 7/1957 | Heymann | 210—388 |
| 2,907,404 | 10/1959 | Mare | 209—400 X |
| 3,026,966 | 3/1962 | Asklöf | 55—277 X |
| 3,045,817 | 7/1962 | Ward | 209—21 |
| 3,053,031 | 9/1962 | Vedder et al. | 55—292 |
| 3,206,397 | 9/1965 | Harvey | 210—388 X |
| 3,305,481 | 2/1967 | Peterson | 210—19 |
| 3,327,401 | 6/1967 | Stamos et al. | 210—384 X |

REUBEN FRIEDMAN, Primary Examiner

W. S. BRADBURY, Assistant Examiner

U.S. Cl. X.R.

209—233, 357; 210—453